United States Patent
Rissin et al.

(10) Patent No.: US 11,295,403 B2
(45) Date of Patent: Apr. 5, 2022

(54) HYBRID SYSTEM AND METHOD FOR PRODUCING OPTIMIZED TRAINING PROGRAM SCHEDULES

(71) Applicant: Britannica Knowledge Systems Ltd., Tel Aviv (IL)

(72) Inventors: Yossef Rissin, Haifa (IL); Asher Dagan, Har Adar (IL); Yosef Ben-Ishay, Tel Aviv (IL)

(73) Assignee: BRITANNICA KNOWLEDGE SYSTEMS LTD., Tel Aviv (IL)

( * ) Notice: Subject to any disclaimer, the term of this patent is extended or adjusted under 35 U.S.C. 154(b) by 128 days.

(21) Appl. No.: 16/170,669

(22) Filed: Oct. 25, 2018

(65) Prior Publication Data
US 2019/0122318 A1 Apr. 25, 2019

Related U.S. Application Data

(60) Provisional application No. 62/576,658, filed on Oct. 25, 2017.

(51) Int. Cl.
*G06Q 50/20* (2012.01)
*G06Q 10/10* (2012.01)

(52) U.S. Cl.
CPC ..... *G06Q 50/2057* (2013.01); *G06Q 10/1097* (2013.01)

(58) Field of Classification Search
None
See application file for complete search history.

(56) References Cited

U.S. PATENT DOCUMENTS 8,447,646 B2   5/2013 Thengvall et al.
2003/0139958 A1* 7/2003 Thengvall ............ G06Q 10/109
                                                   705/7.12

(Continued)

FOREIGN PATENT DOCUMENTS

CN       108846570 A   * 11/2018

OTHER PUBLICATIONS

Diveev A.I. et al., NP-Hard Task Schedules and Methods of its Decision, Sep. 20-22, 2017, Peoples' Friendship University of Russia (RUDN University), Federal Research Center "Computer Science and Control" of Russian Academy of Sciences (Year: 2017).*

(Continued)

*Primary Examiner* — Jerry O'Connor
*Assistant Examiner* — Matthew H Divelbiss
(74) *Attorney, Agent, or Firm* — The Roy Gross Law Firm, LLC; Roy Gross

(57) ABSTRACT

A hybrid computer-based system and method for scheduling a plan of training programs, such as flight training programs, is disclosed. A heuristic scheduler receives a plan request comprising training programs to schedule, along with a plan vector, scheduling rules, and available resources. The scheduler computes a locally optimized scheduling plan of the training schedules in the request. An evaluator evaluates one or more costs of the scheduling plan. A solver employs stochastic methodology of reordering the plan vector, in order to improve the costs. The scheduler, evaluator, and solver are employed iteratively until a globally optimized scheduling plan is determined. In some embodiments, scheduling rules are arranged in a sequence of constraint-relaxed tiers, allowing for flexibility in heuristic scheduling in light of multiple layers of constraints: validity, i.e., (Continued)

inviolable (hard) constraints that training schedules must meet.

21 Claims, 6 Drawing Sheets

(56) References Cited

U.S. PATENT DOCUMENTS

| | | | | |
|---|---|---|---|---|
| 2004/0115596 A1* | 6/2004 | Snyder | ............... | G09B 7/02 |
| | | | | 434/118 |
| 2009/0292550 A1* | 11/2009 | Ly | ............... | G06Q 10/109 |
| | | | | 705/300 |
| 2012/0284207 A1* | 11/2012 | Eder | ............... | G06N 20/00 |
| | | | | 705/36 R |
| 2017/0243166 A1* | 8/2017 | Montgomery | ......... | G06N 20/00 |

OTHER PUBLICATIONS

Yujia Ge et al, Dynamic Staffing and Rescheduling in Software Project Management: A Hybrid Approach, Jun. 10, 2016, PLoS One 11(6): e0157104. (Year: 2016).*

Israeli Office Action for Israeli Patent No. 262625, dated Dec. 28, 2021, 4pp.

* cited by examiner

HYBRID SYSTEM AND METHOD FOR PRODUCING OPTIMIZED TRAINING PROGRAM SCHEDULES

FIELD OF THE INVENTION

The field of the invention relates to optimization systems and methods, and in particular to systems and methods for generating an optimized plan of schedules for training programs.

BACKGROUND TO THE INVENTION

The process of scheduling training courses for large organizations, particularly pilot training and recertification courses for airlines, is an extremely complex task. Considerations must be made for course scheduling requirements as well as regulatory requirements, contractual requirements, quality of the training, and cost-effectiveness of the training.

U.S. Pat. No. 8,447,646B2, to Thengvall, et al., discloses a system for rapidly generating minimum length pilot training schedules. Unique branch and bound trees are generated for use progressively to schedule training class subsets. The system examines training curriculums and training classes to be scheduled to determine how many resources and instructors will be required for each type of curriculum, and whether classes with certain properties will have to be split to provide an efficient processing of the branch and bound trees.

SUMMARY OF THE INVENTION

An aspect of the present invention relates to a hybrid computer-based system for scheduling a plan of training programs, such as flight training programs. The system comprises a scheduler that employs heuristic methods, including a backtracking algorithm with look-ahead strategies, to produce a plan schedule that is locally optimized. The system further comprises an evaluator, which evaluates one or more costs of a plan schedule. The system further comprises a solver that employs stochastic methodology to seek a globally optimized solution. Such a hybrid approach, with heuristics and stochastics alternately and iteratively applied, leads to relatively quick convergence to find a reasonably optimized scheduled plan that can include training programs of differing durations and activity durations, and with varying scheduling rules. In some embodiments, a plan of more than 1,000 training programs can be scheduled by the system. In other embodiments, a plan of more than 5,000 training programs can be scheduled.

Another aspect of the invention is a sequence of constraint-relaxed tiers containing scheduling rules for the training program, allowing for flexibility in heuristic scheduling in light of multiple layers of constraints: validity, i.e., inviolable (hard) constraints that training schedules must meet; feasibility, comprising preferences (e.g., preferred times of day and locations) that can be relaxed or waived; quality of training, comprising preferences sought to decrease the chance of a pilot failing a course and/or requiring remedial training; quality of life, comprising trainee preferences such as working hours and days off; and quantitative factors, which can be directly optimized, such as costs and income.

It is therefore an object of the present invention to provide a non-transitory computer readable medium comprising instructions to a processor for operation of a hybrid system for producing globally optimized schedules of training programs, the system comprising the following modules acting in succession for one or more optimization iteration cycles:

a. a scheduler, configured to
   i. receive
      1. a plan request specifying one or more training programs to be scheduled and required resources for the training programs, the required resources comprising time durations of activities in the training programs and classrooms for activities in the training programs;
      2. a plan vector specifying an order of the training programs in which to process the training programs for scheduling;
      3. course scheduling rules for the training programs; and
      4. available resources, comprising available time slots and classrooms; and
   ii. compute a plan schedule comprising schedules of the training programs in the plan request; the schedules of the training programs computed in order of the training programs in the plan vector; the plan schedule comprising course starting dates and activity time slots of each of the training programs in the plan request 80; computing of the starting dates and the activity time slots in conformity with the available resources and the scheduling rules for the training programs;
b. an evaluator, configured to receive the plan schedule and calculate a plan cost of the plan schedule; and
c. a solver, configured to
   i. receive the plan vector and the plan cost;
   ii. comparing the plan cost with one or more plan costs received in earlier optimization iterations;
   iii. checking whether the plan cost meets an exit criterion and if meeting the exit criterion, then reporting the plan schedule as optimized; and
   iv. if the plan cost does not meet the exit criterion, implement a stochastic algorithm for rearranging the order of the training programs in the plan vector and sending the rearranged plan vector to scheduler for another optimization iteration;
wherein
d. the scheduling rules are in one of a sequence of constraint-relaxed course rules tiers; wherein one or more preferences in each course rules tier are relaxed or waived in a next tier in the sequence; and
e. the scheduling engine is further configured, if the scheduling engine fails to schedule the course starting date and activity times of a training program in conformity with the scheduling rules in the tier, to replace the scheduling rules in the tier with scheduling rules in the next-relaxed tier and repeat the scheduling in (a.) (ii).

It is a further object of the present invention to provide the above system, wherein the scheduling rules in the course rules tiers comprise earliest activity starting time slot, latest activity ending time slot, hours of duty, hours of duty contact, rest time between duties, a maximum time between two activities in a training program, equipment availability hours, restriction of instructors for the activities, exceeding a maximum duration of a training program and any combination thereof.

It is a further object of the present invention to provide any of the above systems, wherein scheduling rules in at least one of the course rules tiers further comprises one or more mandatory constraints.

It is a further object of the present invention to provide any of the above systems, wherein the constraints are selected from a group comprising regulatory requirements, contractual requirements, or any combination thereof.

It is a further object of the present invention to provide any of the above systems, wherein all tiers in the sequence beyond one of the tiers comprise only constraints.

It is a further object of the present invention to provide any of the above systems, wherein the system allows defining the sequence of tiers with an unrestricted limit to a length of the sequence.

It is a further object of the present invention to provide any of the above systems, further comprising display and input devices configured as a user interface, wherein the sequence of tiers are defined and displayed on the user interface.

It is a further object of the present invention to provide any of the above systems, wherein one or more pluralities of the activities in one or more the training courses are grouped in one or more clusters; the course scheduling rules further comprising cluster rules of the clusters.

It is a further object of the present invention to provide any of the above systems, wherein the cluster constraints are selected from a group comprising maximum duration from a first activity to a last activity in a cluster, exceeding a maximum time gap between activities in the cluster, limitations of switching locations during a cluster, whether the cluster must be a first event of a day, a number of days of rest after the cluster, and any combination thereof.

It is a further object of the present invention to provide any of the above systems, wherein the cluster rules of a cluster are arranged in a sequence of constraint-relaxed cluster rules tiers; the scheduler is further configured to replace cluster scheduling rules from one cluster rules tier to a next-relaxed cluster rules tier, if the scheduling engine fails to schedule the activities in a cluster.

It is a further object of the present invention to provide any of the above systems, wherein the scheduler is further configured to employ a look-ahead-to-save algorithm in order to find one or more of a least expensive date and time slot in a day to schedule an activity.

It is a further object of the present invention to provide any of the above systems, wherein the scheduler is further configured to find resources having a minimum hourly rate.

It is a further object of the present invention to provide any of the above systems, wherein scheduler is further configured to schedule a training program to start at a late-in-the-day the time slot and/or end at an early-in-the-day the time slot.

It is a further object of the present invention to provide any of the above systems, wherein for one or more of the time slots in a day, the scheduler is configured with a said scheduling rule to exclude travel to an activity on a same day as the activity if the activity is scheduled during the at least one time slot.

It is a further object of the present invention to provide any of the above systems, further comprising a demand analyzer, wherein the demand analyzer is configured to order the training courses in a plan vector of an initial optimization iteration according to an order selected from the group consisting of earlier-to-later course early boundary date, later-to-earlier course early boundary date, longest-to-shortest course duration, shortest-to-longest course duration, long-slack to short-slack, short-slack to long-slack, according to input of a user, at random, and any combination thereof.

It is a further object of the present invention to provide any of the above systems, wherein the scheduler is further configured to employ a look-ahead-to-share algorithm in order to find one or more activities in the training program that can share the same resource.

It is a further object of the present invention to provide any of the above systems, wherein the scheduler is further configured to link the one or more activities.

It is a further object of the present invention to provide any of the above systems, wherein the scheduler is further configured, upon failing to find the course starting date of a training program or the activity time slots for a activity, to reset the one or more training programs and activities and search for a rescheduling date to reschedule the training program.

It is a further object of the present invention to provide any of the above systems, wherein the scheduler is further configured to manage at least one black and white calendar, each the black and white calendar comprising
  a. black dates, defined as dates on which the scheduling engine failed to schedule the training programs or activities; and
  b. white dates, defined as dates on which the scheduling engine succeeded to schedule the training programs or activities.

It is a further object of the present invention to provide any of the above systems, wherein the scheduler is configured to search the white dates and skip the black dates when searching for the rescheduling date.

It is a further object of the present invention to provide any of the above systems, wherein the scheduler is further configured to calculate time boundaries of each of the clusters, wherein the time boundaries of a cluster comprises an earliest start date and a latest finish date of the cluster, in light of a proposed initial date of the cluster, cluster properties, activities properties, maximum duration of a cluster, or any combination thereof.

It is a further object of the present invention to provide any of the above systems, wherein the scheduler is further configured to identify a failure to schedule a cluster, the identification is made in light of the time boundaries of the cluster.

It is a further object of the present invention to provide any of the above systems, wherein the scheduler is further configured to optimize a sequence of the activities in the cluster, in light of resource utilization and activity scheduling rules.

It is a further object of the present invention to provide any of the above systems, wherein the scheduling engine is further configured to perform a preliminary analysis of the cluster constraints in a cluster, the preliminary analysis yielding a most constrained activity to schedule in the cluster.

It is a further object of the present invention to provide any of the above systems, wherein the most constrained activity to schedule is identified by its duration, utilization level of critical resources, scheduling time range, type of activity, or any combination thereof.

It is a further object of the present invention to provide any of the above systems, wherein the type of activity is selected from a group comprising activities in a classroom, at a flight simulator, on a flight, and any combination thereof.

It is a further object of the present invention to provide any of the above systems, wherein the scheduling engine is further configured to utilize the look-ahead-to-save algorithm, the look-ahead-to-share algorithm, or any combination thereof in order to find a valid time to schedule the most challenging activity to schedule, and then to calculate other activities in the cluster accordingly.

It is a further object of the present invention to provide any of the above systems, wherein the scheduler further comprises a location manager, wherein the location manager is configured to find one or more least expensive locations to conduct a training program, to minimize the number of changes of locations during the training program, to minimize a number of trips by one or more instructors of the training program, or any combination thereof.

It is a further object of the present invention to provide any of the above systems, wherein the location manager tries to schedule a training program, a cluster, or a activity at a preferred location; wherein if the preferred location is fully utilized, the location manager schedules the training program, cluster, or activity at a next-preferred location.

It is a further object of the present invention to provide any of the above systems, wherein the preferred location and next-preferred locations are specified by a user.

It is a further object of the present invention to provide any of the above systems, wherein the location manager further tries to schedule another cluster or another activity at the scheduled location.

It is a further object of the present invention to provide any of the above systems, wherein a cluster rule has an "allow change of location" parameter; wherein if the "allow change of location" parameter is set to "no," then all activities in the cluster must be scheduled in a same location.

It is a further object of the present invention to provide any of the above systems, wherein the scheduling engine further comprises a capacity manager; the capacity manager is configured to define one or more instructor buffers; the buffers being numbers instructors to be kept on reserve contingency absences of allocated instructors.

It is a further object of the present invention to provide any of the above systems, wherein the buffers comprise buffers for types of contingency absences selected from a group comprising days off, sick days, unplanned events, and any combination thereof.

It is a further object of the present invention to provide any of the above systems, wherein the capacity manager is further configured to define the one or more buffers on a basis of per day, as an average per week, as an average per month, as an average per any time range, or any combination thereof.

It is a further object of the present invention to provide any of the above systems, wherein the capacity manager is further configured to define a buffer per month and tries to balance the buffer according to the training volume per day and known availability of resources.

It is a further object of the present invention to provide any of the above systems, wherein the scheduling engine is further configured to provide a feasible schedule according to known constraints and according to the one or more buffers.

It is a further object of the present invention to provide any of the above systems, wherein the scheduling engine is further configured to schedule travel between training centers in light of an airline flight schedule.

It is a further object of the present invention to provide any of the above systems, wherein the evaluator is configured to impose a penalty for each hour of deviation from a first legal time of an activity.

It is a further object of the present invention to provide any of the above systems, wherein the non-linear stochastic algorithm employed by the solver module is a simulated annealing algorithm.

It is a further object of the present invention to provide any of the above systems, wherein the plan vector further comprises an initial start date for each of the schedules of the training programs.

It is a further object of the present invention to provide any of the above systems, wherein exit criterion is selected from a group comprising a maximum number of optimization iterations, a maximum amount of elapsed processing time, the plan cost 70 reaching a predefined cost target, the plan cost 70 reaching a predefined improvement in reduced cost or increased profit, reaching an optimization iteration when an improvement in reduced cost or increased profit does not exceed a threshold fraction of a previous plan cost, and any combination thereof.

It is a further object of the present invention to provide any of the above systems, wherein a user provides a plan vector.

It is a further object of the present invention to provide any of the above systems, wherein the available resources list further specifies available equipment, available instructors, available flights to locations of training centers, available pilots, and any combination thereof.

It is a further object of the present invention to provide any of the above systems, wherein the evaluator is further configured to receive a file containing a list of costs and benefits.

It is a further object of the present invention to provide any of the above systems, wherein the plan request comprises 1,000 or more training courses.

It is a further object of the present invention to provide any of the above systems, wherein the plan request comprises 5,000 or more training courses.

It is a further object of the present invention to provide a method of employing the above system for producing globally optimized training program schedules, comprising steps of
  a. obtaining
    i. a plan request specifying one or more training programs to be scheduled and required resources for the training programs, the required resources comprising time durations of activities in the training programs and classrooms for activities in the training programs;
    ii. an initial plan vector specifying an order of the training programs in which to process the training programs for scheduling;
    iii. course scheduling rules for the training programs; and
    iv. available resources, comprising available time slots and classrooms;
  b. computing a schedule of a training program; the schedules of the computed in order of the training programs in the plan vector; the plan schedule comprising course starting dates and activity time slots of each of the training programs in the plan request; computing of the starting dates and the activity time slots is made in conformity with the available resources and the course scheduling rules for the training programs;
  c. repeating the step of computing a schedule for each training program in the plan vector, whereby a plan schedule is complete;
  d. evaluating a plan cost of the plan schedule;

e. comparing the plan cost with one or more plan costs from earlier optimization iterations of the method;
f. if the plan cost meets an exit criterion, then reporting the plan schedule as a globally optimized plan schedule;
g. if the plan schedule does not meet the exit criterion, then
  i. computing a new plan vector; the computing a new plan vector employing a stochastic algorithm 235; and
  ii. replacing the plan vector with the new plan vector and proceeding from step (b);
wherein
h. the scheduling rules are in one of a sequence of constraint-relaxed course rules tiers; wherein one or more of the scheduling rules in the course rules tier are relaxed or waived in a next-relaxed tier in the sequence; and
i. the computing of a schedule further comprises a step, if failing to schedule the course starting date and activity times of a training program in conformity with the scheduling rules in the course rules tier, replacing the scheduling rules of the course rules tier with scheduling rules in the next-relaxed tier in the sequence and repeating the step of scheduling of the plan request from step (b).

It is a further object of the present invention to provide the above method, wherein the scheduling rules in the course rules tiers comprise earliest activity starting time slot, latest activity ending time slot, hours of duty, hours of duty contact, rest time between duties, a maximum time between two activities in a training program, equipment availability hours, restriction of instructors for the activities, or any combination thereof.

It is a further object of the present invention to provide any of the above methods, wherein scheduling rules in at least one of the course rules tiers further comprise mandatory constraints.

It is a further object of the present invention to provide any of the above methods, wherein the constraints are selected from a group comprising regulatory requirements, contractual requirements, or any combination thereof.

It is a further object of the present invention to provide any of the above methods, wherein a preference in at least one of the course rules tiers is relaxed in a succeeding course rules tier.

It is a further object of the present invention to provide any of the above methods, wherein a preference in at least one of the course rules tiers is relaxed to a constraint in succeeding course rules tiers.

It is a further object of the present invention to provide any of the above methods, wherein a preference in at least one of the course rules tiers is waived in successive course rules tiers.

It is a further object of the present invention to provide any of the above methods, wherein all tiers in the sequence beyond one of the tiers comprise only constraints.

It is a further object of the present invention to provide any of the above methods, wherein the system allows defining the sequence of tiers with an unrestricted limit to a length of the sequence.

It is a further object of the present invention to provide any of the above methods, further comprising display and input devices configured as a user interface, wherein the sequence of tiers are defined and displayed on the user interface.

It is a further object of the present invention to provide any of the above methods, the step of computing a schedule of a training program comprising steps of
a. searching for a next available course starting date that meets the course scheduling rules for the training program;
b. if a the available course starting date is not found, then replacing the scheduling rules with a next tier in the sequence of course scheduling tiers;
c. scheduling the course starting date of the training program to the found next available course starting date;
d. selecting an activity in the training program for scheduling;
e. searching for a number next available activity time slots required for scheduling the activity; the activity time slots no earlier than the course starting date; the activity time slots meeting the course scheduling rules;
f. if the next available activity time slots are found, then scheduling the activity for the found activity time slots;
g. if a next available activity time is not found, then cancelling the course starting date and the scheduled activity time slots of the training program and returning to step (a);
h. repeating step (c)-(f) for each activity in said training program; and
i. repeating steps (a)-(h) for each training program in the plan.

It is a further object of the present invention to provide any of the above methods, wherein the rules are selected from a group consisting of a maximum time of a daily duty; maximum daily work time; minimum rest time between the daily duties; maximum time between two specific activities; earliest hour to start an activity; latest hour end an activity; and any combination thereof.

It is a further object of the present invention to provide any of the above methods, wherein at least some of the activities in the training program are arranged into one or more clusters; the scheduling object data further comprises one or more cluster scheduling rules for a cluster; the method further comprising steps of
a. selecting a cluster in the training program;
b. selecting an activity in the cluster of the training program;
c. the step of searching for a number of time slots required for scheduling the activity that meet course scheduling rules further comprises the requirement that the time slots meet the cluster scheduling rules; and
d. if the activity time slots were not found, then cancelling the scheduled course starting date and activity times of the training program and proceeding with step (a).

It is a further object of the present invention to provide any of the above methods, wherein the cluster scheduling rules are in one of a sequence of constraint-relaxed cluster rules tiers; wherein the one or more cluster scheduling rules in a cluster rules tier are removed or relaxed in a next cluster rules tier in the sequence; the method further comprising steps of
a. if the activity time slots are found, checking if there is a next relaxed cluster rules tier in the sequence; and
b. if there is a next relaxed cluster rules tier, then
  i. cancelling the scheduled activity times for activities in the cluster;
  ii. shifting to the next relaxed cluster rules tier 565; and
  iii. proceeding with step (b).

It is a further object of the present invention to provide any of the above methods, wherein the step of searching for a next available course starting date is selectable from a group consisting of: searching for an earliest next available course starting date, searching for a fixed-balancing starting date, and searching for a dynamic-balancing starting date; further wherein a latest course starting date is calculated as:

Latest course starting date=the Latest course ending date of the training program−the Minimum course duration of the training program It is a further object of the present invention to provide any of the above methods, wherein the searching for an earliest next available course starting date comprises steps of
   a. selecting the early boundary date for the training program;
   b. if the selected date is blacked out, then selecting a date on the morrow of the blacked out date and repeating step (b);
   c. if the selected date does not meet the scheduling rules, then blacking out the selected date and proceeding from step (b);
   d. if the selected date is later than a late boundary date of the training program, then proceeding to the step of relaxing the course rules to the next-relaxed tier;
   e. reporting the selected date as the next available starting date and proceeding to the step of scheduling the starting date.

It is a further object of the present invention to provide a non-transitory computer readable medium comprising instructions to a processor for operation of a scheduler, the scheduler configured to produce one or more heuristically optimized schedules for a plan comprising one or more training programs, wherein:
   a. the non-transitory computer-readable medium comprises a plan folder, the plan folder containing plan data comprising
      i. a plan request file specifying
         1. one or more training programs to be scheduled; and
         2. resources required for the training programs, the resources comprising time durations and classrooms for activities in the training programs;
      ii. a plan vector file specifying an order of the training programs in which to create a schedule for each of the training programs;
      iii. one or more course tiers files; each the course tiers file specifying scheduling rules for a training program; and
      iv. an available resources file specifying available time slots and classrooms;
      v. a schedule file storing the schedules;
   b. the non-transitory computer-readable medium further comprising operational instructions for a scheduling engine, the scheduling engine configured to
      vi. read scheduling object data comprising the plan request file, the plan vector file, the one or more tiers files, and the and the course tiers files; and
      vii. schedule course starting dates and activity times of a training program such that the course starting date and activity times meet the scheduling rules for the training program;
   wherein
   c. the scheduling rules for a training program are in one of a sequence of constraint-relaxed course rules tiers in a course tiers file; wherein one or more course scheduling rules in a course rules tier are relaxed or removed in a next-relaxed tier in the sequence; and
   d. the scheduling engine is further configured, if the scheduling engine fails to schedule the course starting date and activity times, then to replace the scheduling rules in the tier with the scheduling rules in the next-relaxed tier and repeat the scheduling in (ii).

It is a further object of the present invention to provide the above scheduler, wherein scheduling rules in at least one of the course rules tiers comprises constraints and preferences.

It is a further object of the present invention to provide any of the above schedulers, wherein a preference in at least one of the course rules tiers is relaxed in a succeeding the course rules tier.

It is a further object of the present invention to provide any of the above schedulers, wherein a preference in at least one of the course rules tiers is relaxed to a constraint in succeeding course rules tiers.

It is a further object of the present invention to provide any of the above schedulers, wherein a preference in at least one of the successive course rules tiers $90_0$-$90_{n-1}$ is waived in successive course rules tiers $90_1$-$90_n$.

It is a further object of the present invention to provide any of the above schedulers, wherein the absolute requirements are selected from a group comprising regulatory requirements, contractual requirements, or any combination thereof.

It is a further object of the present invention to provide any of the above schedulers, wherein the system allows defining the sequence of tiers with an unrestricted limit to a length of the sequence.

It is a further object of the present invention to provide any of the above schedulers, further comprising display and input devices configured as a user interface, wherein the sequence of tiers are defined and displayed on the user interface.

DETAILED DESCRIPTION

Definitions

Figure 1:
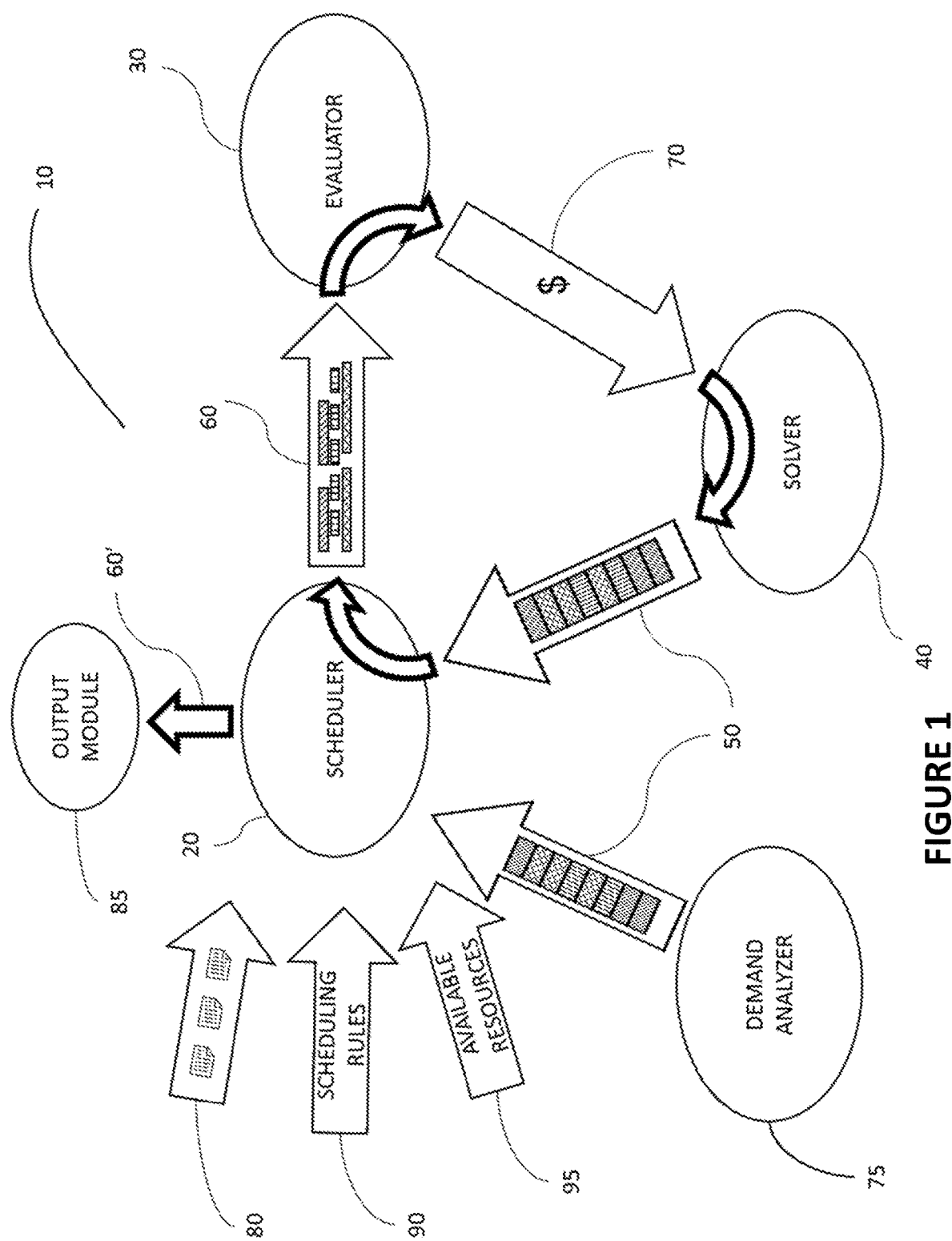
FIG. 1 shows a block diagram of a hybrid computer-based system for producing a globally optimized plan schedule of training programs, according to some embodiments of the invention.

"Training program" refers to a course for training employees; for example, a flight training course. In this application, the terms "training program," "training course," and "course" are used interchangeably.

"Resource" refers to any item required for conducting an activity in a training program. Time slots, classrooms, instructors, and equipment requirements are examples of resources.

"Schedule" refers to a detailed timetable and allocation of resources for a training program created by an embodiment of the invention, whether final or in the process of being formulated.

"Plan" refers to a plurality of course schedules that are scheduled by a system of the present invention. A plan can include different courses and/or multiple instances of the same course.

"Activity" refers to a segment of a training program. It can be, for example, a segment over a specific time interval, held at the same location, by the same instructor, and/or using a particular resource.

"Classroom" refers to any location where a training activity is conducted. There can be more than one kind of classroom (e.g., in terms of size and available facilities), depending on activity requirements.

"Cluster" refers to a group one or more activities within a training program. Activities in a cluster are often subject to cluster rules and therefore activities in a cluster are scheduled together.

"Plan vector" refers to an order in which courses are to be scheduled.

"Cluster scheduling vector" refers to an order in which activities in a cluster are to be scheduled.

"Rule" refers to a guideline for scheduling of a course or an activity.

A "constraint" is a type of rule whose fulfillment is mandatory.

A "preference" is a type of rule whose fulfillment is optional, and can be relaxed or waived.

A "tier" refers to a set of rules. A plurality of tiers are arranged in a sequence of descending stringency. Each successive tier in the sequence has one or more preferences relaxed and/or waived from a preceding tier in the sequence.

"Cluster rule" refers to a guideline for scheduling of a cluster. Like courses, cluster rules also comprise cluster constraints and cluster preferences, and cluster rules may be arranged in cluster tiers.

"Time" refers to a specific date and time of day. "Time slot" refers to a time interval, wherein the interval times are predefined (e.g., 0700-0800 and every one-hour interval thereafter).

A "valid" time or date refers to an available time or date in which present scheduling rules (e.g., in a present tier) are met.

"Early/late barrier date" refers to the earliest/latest date on which activities in a training program may be scheduled. Note that a course activity may or may not actually be actually scheduled, during the scheduling process, on the barrier dates.

"Penalty" refers to a deduction from a figure of merit. A penalty can be imposed for scheduling a course or activity at non-optimal place (e.g., overnight penalty for starting a course in Denver at 0600, whereby pilots in Miami have to take a flight the day before and stay in a hotel). There can be different kinds of penalty accounts; for example, monetary (cost) and time penalties.

"Benefit" is the opposite of a penalty. It is a reward given for meeting an optimization goal.

Descriptions of Embodiments

Embodiments of the present invention are now described in detail.

Reference is now made to FIG. 1, showing a hybrid system for global optimization of training program schedules 10, according to some embodiments of the invention. System 10 comprises three computer-based modules: a scheduler 20, which heuristically produces locally optimized training program schedules; an evaluator 30, which evaluates the total cost or net cost benefit of a schedule; and a solver 40, which employs a stochastic algorithm to find a globally optimized solution to scheduling the training programs. Scheduler 20, evaluator 30, and solver 40 are deployed in iterative optimization cycles until obtaining a globally optimized schedule.

In the following descriptions, embodiments of the invention shall be applied to scheduling of flight training programs. However, it is understood that the teachings of the invention are also applicable to other types of training programs and any type of scheduled program.

Scheduler 20 receives a plan request 80. Plan request 80 may be supplied, in a first iteration for example, by a user of system 10 (e.g., at a training facility who is responsible for scheduling the facility's training programs).

Plan request 80 comprises a list of training programs that require scheduling. Plan request 80 may comprise multiple instances of different types of training programs; for example, pilot certification programs such as a pilot qualification program, a transition program, a captain upgrade program, a requalification program, and a continuing qualification program. Plan request 80 specifies a list of activities for each type of training program. Plan request 80 specifies a date range for each training program—an early barrier date and a late barrier date—within which the training program must begin and end. Plan request 80 may specify resources required for each activity in each different type of training program; for example, time duration, classroom, specific equipment, and required credentials for an instructor of a particular activity.

Scheduler 20 may further receive course scheduling rules 90. Course scheduling rules 90 can include, for example, allowed times of day to start training, maximum duty time (time between punch-in and punch-out), maximum duty content (time spent in training program activities), and minimum rest time between duties.

Course scheduling rules 90 may be arranged in a sequence of constraint-relaxed tiers. Rules in tier may be a combination of constraints, whose compliance is required and cannot be relaxed, and preferences, which can be relaxed or in some cases dropped altogether in subsequent tiers of the sequence. For example, a preference for training starting time can be 10:00 a.m. in an earlier tier in the sequence, but can be relaxed in subsequent tiers in the sequence up to a constraint of 6:00 a.m.

Scheduler 20 may receive (or may store) an available-resources list 95. Available resources list 95 specifies available times, locations, and other resources available for scheduling training programs in plan request 80. Available resources list may comprise, for example, a database of a totality of time slots, classrooms, and equipment, with resources allocated to previously scheduled training courses flagged as unavailable. Available resources list 95 may further comprise available instructors, available flights to locations of training centers, and available pilots.

Scheduler 20 may receive a plan vector 50 specifying the order in which to process the training programs in plan request 80 for scheduling.

A plan vector 50 for an initial optimization iteration may be supplied by a demand analyzer 75. Demand analyzer 75 may be configured to order courses in an order of the earlier-to-later earliest starting dates of the training courses, later-to-earlier earliest starting dates, or in order of maximum duration (either longest- or shortest-maximum duration courses first). Demand analyzer may order courses from those with the widest range of possible starting dates (long slack) to the shortest range of possible starting dates (short slack), or vice-versa. Demand analyzer 75 may give an option to a user to order plan vector 50 or specify a random order.

In subsequent optimization iterations (after the initial optimization iteration), scheduler 20 receives plan vector 50 from a solver 40 (further described herein) of system 10.

Scheduler 20 implements heuristic methods to find a locally optimized schedule 60 for the training programs. Scheduling large numbers (in some embodiments, up to 1000 flight training programs) of training programs with different course durations—and activities with different activity durations within each training program—is an NP-hard bin-packing problem, which is known to have no deterministic optimization. According to teachings of the present invention, scheduler 20 is provided with a scheduling algorithm employing a heuristic backtracking model and look-ahead strategies (further described herein) for generating locally optimized schedules of the training programs. Scheduler 20 produces a scheduled plan 60, including designation of course starting dates, activity times, classrooms, and required equipment of the training programs specified in plan request 80. In combination with the rest of system 10, the algorithm employed by scheduler 20 is an integral component of achieving fast iteration convergence in finding a reasonably optimized scheduled plan 60.

System 10 further comprises an evaluator 30. Evaluator 30 receives a scheduled plan 60 from scheduler 20. Evaluator 30 calculates a plan cost 70 of scheduled plan 60. Typically, training costs are incurred by an employer of a student of a training course. Plan cost 70 can be total costs based on a zero-baseline training costs to the employer, or even a profit generated by the scheduled plan 70. However, in a preferred embodiment, plan cost 70 is a sum of benefits and penalties assigned to particular scheduling features in scheduled plan 60. For example, if an activity is scheduled early in the day after a rest period of one or more days, a cost penalty can be assessed for an overnight stay required by attendees for early morning attendance. Conversely, a cost benefit can be awarded if the activity is scheduled late in the day, when there is no requirement for an overnight stay by course attendees.

System further comprises a solver 40. Solver 40 receives a plan cost 70 from evaluator 30. Solver 40 retains plan vectors 50 (or identifying parameters thereof) and corresponding plan costs 70 from previous optimization iterations of the optimization cycle. Solver 40 compares plan cost 70 with a plan cost 70 of one or more scheduled plan 60 of the previous optimization iterations. Solver 40 employs a stochastic algorithm to reorder the present plan vector 50. For an initial iteration, solver 40 may reorder the present plan vector 50 according pre-determined parameters of the stochastic algorithm.

For example, solver 40 may employ a simulated annealing algorithm. In an early optimization iteration, when plan vector 50 is still far from a global optimization, solver 40 may operate at a high temperature, wherein all training programs in plan vector 50 are randomly reordered, much like shuffling an entire deck of cards. In later optimization iterations, as plan cost 70 improves and plan vector 50 approaches global optimization, solver 40 may operate at lower temperatures, wherein reordering will occur over smaller fractions of neighboring training programs in plan vector 50, much like shuffling halves, quarters, etc. of a deck of cards. Solver 40 produces a new plan vector 50 to be received by the scheduler 20 for another optimization iteration cycle.

After receiving a plan cost 70, solver 40 determines if an exit criterion is met. In a preferred embodiment, the exit criterion is that plan cost 70 is not improving by more a threshold factor (e.g., not more than 0.5%) in successive optimization iterations. Alternatively, an exit criterion can be reaching a specified number of optimization iteration cycles, reaching a specified processing time of system 10, reaching a cost or profit goal, or reaching a predefined improvement factor (e.g., ten times) over the initial optimization iteration.

When solver 40 determines that the exit criterion is met, system 10 ends processing and reports the last scheduled plan 60 produced by scheduler 20 as a globally optimized plan schedule 60'. Globally optimized plan schedule 60' is received by an output module 85. Output module 85 can be, for example, a printer that prints out globally optimized plan schedule 60' and/or a database connected to an application that displays globally optimized plan schedule 60' or portions thereof relevant to an owner of a computing device registered with the application.

Figure 2:
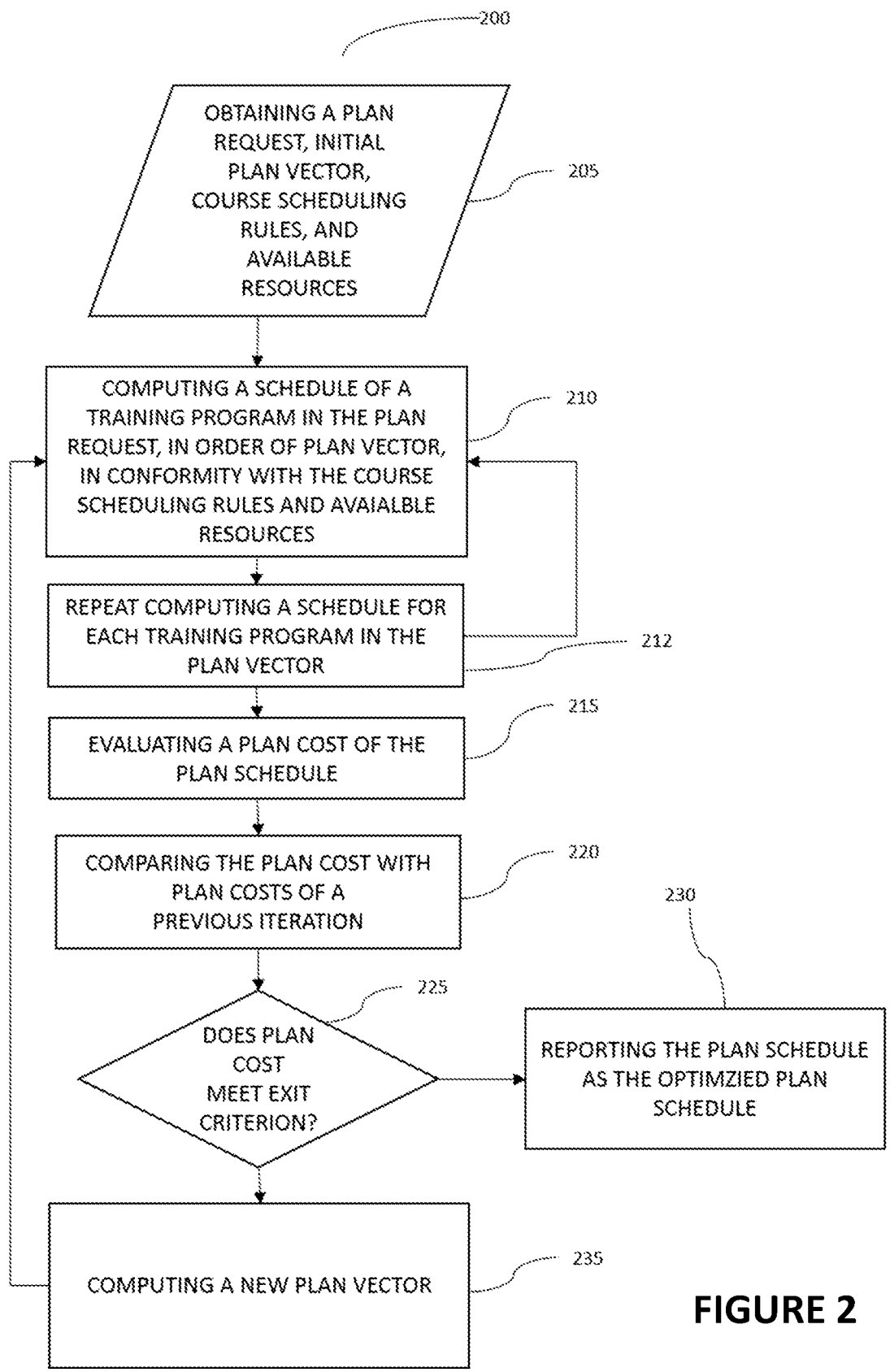
FIG. 2 shows a flow chart of a method for producing a globally optimized plan schedule of training programs, according to some embodiments of the invention.

Reference is now made to FIG. 2, showing a flow chart of a method 200 of producing globally optimized training program schedules, according to some embodiments of the invention.

Method 200 includes a step of obtaining a plan request, initial plan vector, course scheduling rules, and available resources 205.

The plan request may be generated according to course enrollment and/or employer requirements. The plan request may be input by a human or obtained from computer-stored data, such as a database containing requests by employers for training programs.

The initial plan vector may be generated by a user according to experience of a plan vector that is likely to be close to optimized, thereby reducing how many optimization iteration cycles are required to find a globally optimized plan schedule. Alternatively, the initial plan vector can be randomly generated.

Course scheduling rules can comprise both hard constraints, such as regulatory and contractual requirements, as well as preferences such as a preferred location and/or a time of day to schedule an activity.

Method 200 includes a step of computing a schedule of a first (for succeeding training programs, next) training program in the plan vector 210. The schedule is made using a method (described herein) to conform with course requirements in the plan request, the scheduling rules, and the available resources. The step is repeated 212 for each training program in the plan vector.

Method 200 includes a step of evaluating the plan cost 215. An evaluator can, for example, impose a penalty for an early start on the first day or a late finish on the last day of a series of events at the same location (requiring travel and an overnight stay), a penalty for exceeding a preferred number of maximum days of a training course, a penalty for granting a rest day before completing a minimum number of successive training days (e.g., 4 or 5), a cost per resource hour or per time slot, a penalty for not avoiding specific dates and times requiring travel (e.g., based on a flight schedule), and a benefit (reward) for successfully scheduling a course.

Method 200 includes a step of comparing the plan cost with one or more plan costs of previous iterations 220.

Method 200 includes a step of determining if the plan cost meets an exit criterion 225. If so, the plan schedule is reported as the globally optimized plan schedule 230. If not, a new plan vector is computed 235, typically using a stochastic optimization algorithm, and returning to computing a new plan schedule in order the training courses in the new plan vector 210.

Figure 3:
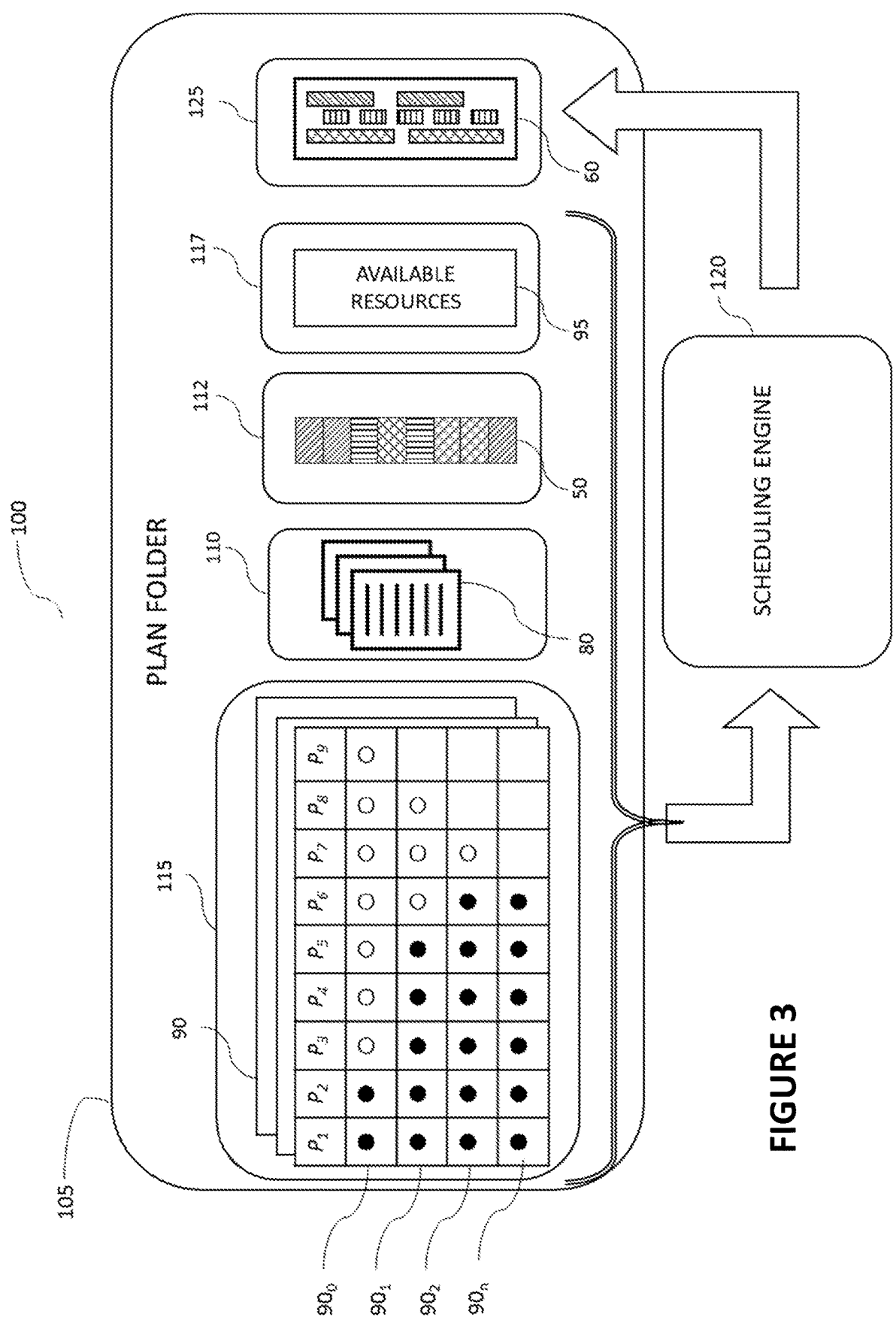
FIG. 3 shows a block diagram of a scheduler, according to some embodiments of the invention.

Reference is now made to FIG. 3, showing a block diagram of a scheduler 100, according to some embodiments of the invention.

Scheduler 100 comprises a plan folder 105. Plan folder contains a plan request file 110, comprising a plan request 80; a plan vector file 112, comprising a plan vector 50; a course tiers file 115, comprising scheduling rules, arranged in constraint-relaxed tiers; an available-resources file 117 comprising an available-resources list 95 and a plan schedule file 125, comprising a plan schedule 60.

Scheduler 100 further comprises a scheduling engine 120, which in interaction with plan folder 105 schedules training courses of the plan using a heuristic optimization method (further described herein).

Course tiers file 115 contains a sequence 90 of course tiers comprising course rules arranged in a sequence of tiers $90_0$-$90_n$. Each course tier $90_0$-$90_n$ may contain constraints and preferences. For example, in an initial course tier $90_0$ there are two constraints $P_1$-$P_2$ and seven preferences $P_3$-$P_9$. In a next-relaxed course tier $90_1$, three preferences $P_3$-$P_5$ are relaxed to their constrained values, one preference $P_9$ is waived, and three preferences $P_6$-$P_8$ are relaxed. In tier $90_2$, $P_6$ is relaxed to its constrained value, $P_7$ remains, and $P_8$ is waived. In a final tier $P_n$, all preferences have either been waived or relaxed to their constrained values, and only constraints $P_1$-$P_6$ remain.

In some embodiments, activities in training program may be divided into clusters. A cluster is a sequence of activities with a logical connection (e.g., an instructor with a specific certification, a certain piece of required equipment that are constrained, or preferred, to be scheduled in the same location in a minimal number of days). In some embodiments, clusters scheduling rules, just course scheduling rules, may be arranged in a sequence of constraint-relaxed tiers. A cluster may have its own specific cluster tiers sequence.

Figure 4A:
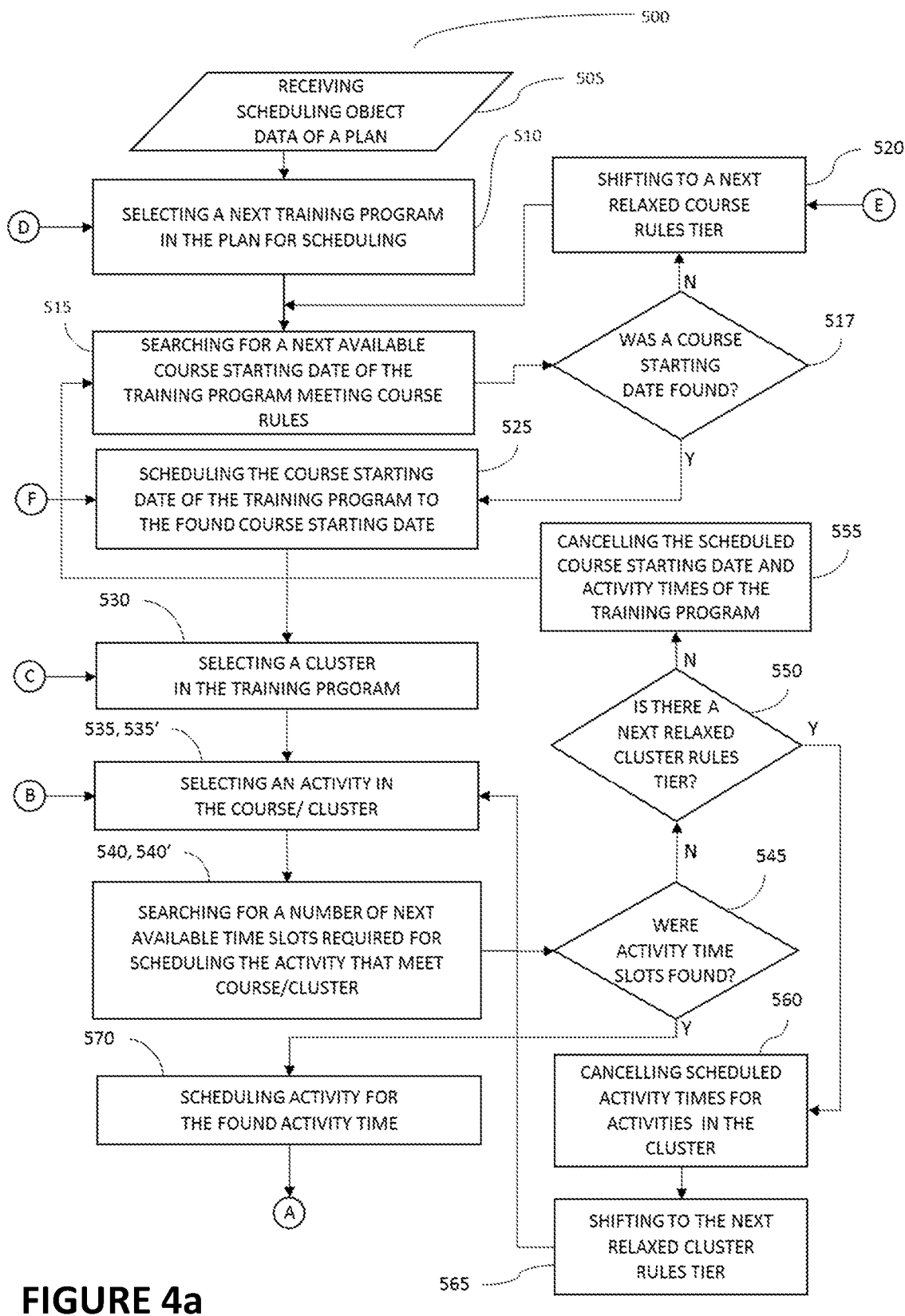
FIGS. 4a and 4b show a flow chart of a method for scheduling a plan of training programs.
Figure 4B:
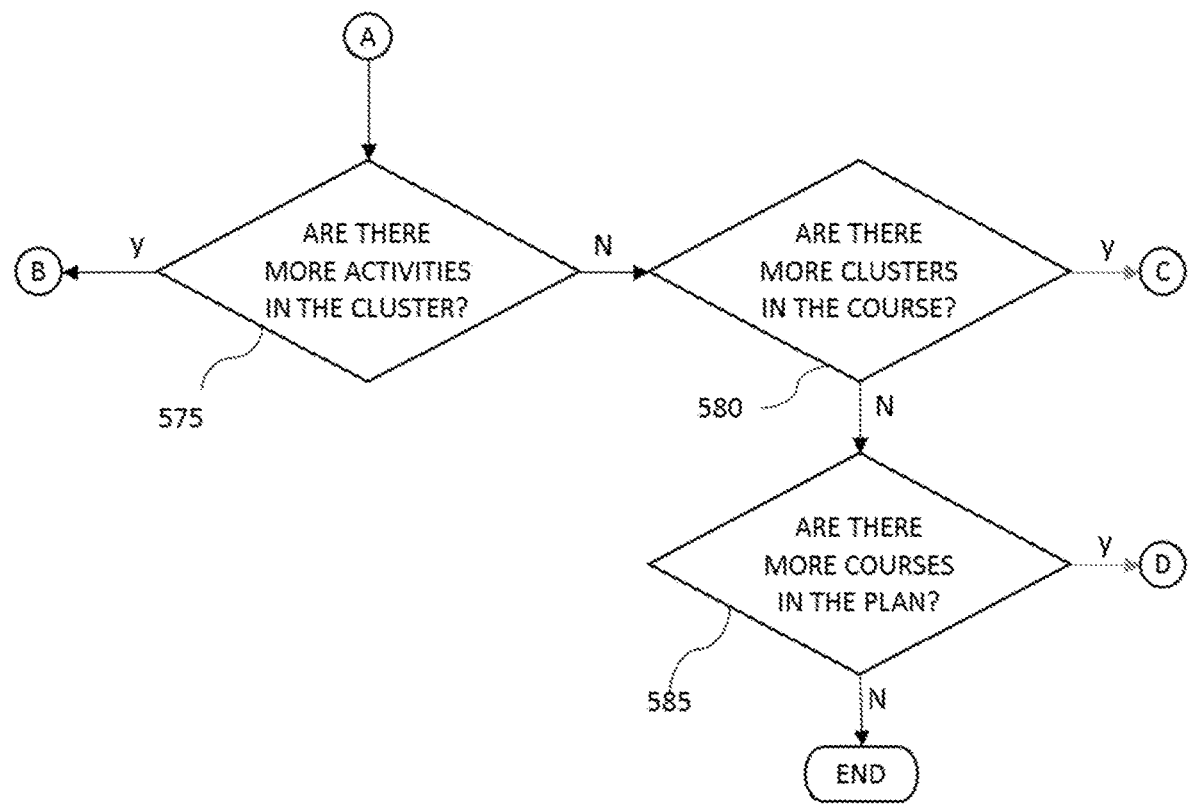

Reference is now made to FIGS. 4a and 4b, showing a flow chart of a method 500, used by the scheduler, for scheduling a plan.

Method 500 includes a step of receiving scheduling object data 505, comprising a plan request, a plan vector, course scheduling tiers, and available resources.

Method 500 includes a step of selecting a a next training program in the plan vector for scheduling 510.

Method 500 includes a step of searching for a next available starting date of the training program meeting the course rules in the present tier 515. The next available starting date can be the earliest available starting date. Alternatively, the next available starting date can be a balanced starting date, wherein starting dates are distributed up to a maximum number of training program starting dates over the training program slack. Slack is the range of possible starting dates of a training program, given by the difference between the range of dates (Latest ending date–Earliest start date) and the minimum course duration. Alternatively, the next available starting date can be a dynamically balanced starting date, which is the date within the slack range in which the fewest training courses are presently scheduled.

If a starting date is not found 517N, the course rules are replaced by those in the next-relaxed tier in the course tiers sequence 520.

In some embodiments, where course activities are organized in clusters, method 500 includes a step of selecting a cluster in the training program 530. The plan vector may additionally specify an order of clusters and/or single activities to process for scheduling. Alternatively, a cluster can be selected by a user or can be selected at random.

Method 500 includes a step of selecting an activity in the course 535, or, if a cluster was selected 530, selecting an activity in the cluster 535'.

Method 500 includes a step of searching for a number of next available time slots required for the activity that meet course rules in the present course rules tier 540 and, if the activity is part of a cluster 540', the cluster rules.

If next available time slots for the activity are not found 545N, then, if there is a next relaxed course rules tier 550Y, then the present cluster schedule is cancelled 560, cluster rules are replaced by the next relaxed cluster tier 565, and method 500 returns to selecting an activity in the cluster for scheduling 535'. If there is not a next-relaxed cluster tier 550N (or the activity is not part of a cluster), the training course schedule, including the scheduled starting date and scheduled activity dates, is cancelled at step 555 and method 500 returns to searching for a next available starting date 515.

If activity time slots are found, then method 500 schedules the activity for the found activity time slots 570.

If there are more activities in the cluster 575Y, method 500 again selects an activity for scheduling 535.

If there are more clusters in the training program 580Y, method 500 again selects a cluster for scheduling 530.

If there are more courses in the plan 585Y, method 500 selects the next program in the plan for scheduling 510. If not 585N, then the plan schedule is complete.

Figure 5:
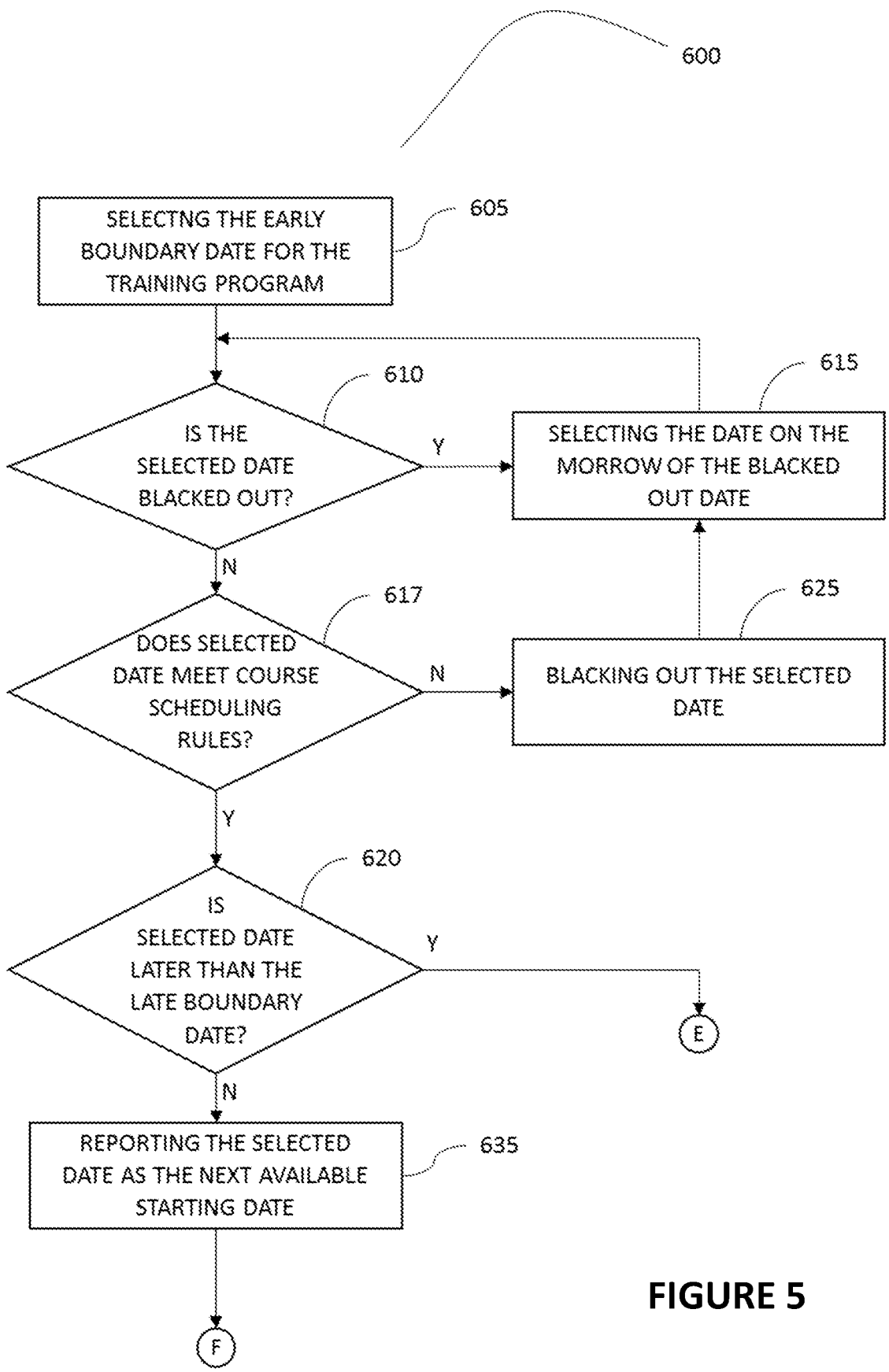
FIG. 5 shows a flow chart of a method for finding an earliest available starting date for a training program, according to some embodiments of the invention.

Reference is now made to FIG. 5, showing a flow chart of a method 600 for finding an earliest available starting date, according to some embodiments of the invention.

Method 600 begins by selecting the early boundary date for the training program 605.

Method 600 includes a step, if the selected date is blacked out 610Y, of selecting the date on the morrow (i.e., the next calendar date) of the selected date 615, until finding a date that is not blacked out 610N.

Method 600 includes a step, if the selected date does not meet course scheduling rules 617N, of blacking out the selected date 625 and proceeding from the step of selecting the date on the morrow 615 until finding a date that is not blacked out.

Method 600 includes a step 620 of reporting the selected date as the next available starting date 635. The main scheduling method 500 then proceeds from the step of scheduling the course starting date to the next available starting date 525, as selected by method 600 in step 635.

The invention claimed is:

1. A computer-implemented system for globally optimizing schedules of training programs, said system comprising a processor and a memory storing instructions executable by said processor, said instructions configured to implement the following three modules iteratively to determine a globally optimized plan schedule of said training programs,
   a. a scheduler, for determining a locally optimized plan schedule of training programs, said scheduler configured to
      i. receive:
         a) a plan request specifying a plurality of training programs to be scheduled and resources required for said training programs, said required resources comprising time durations of activities in said training programs and classrooms for activities in said training programs;

b) a plan vector specifying an order in which to process said training programs for scheduling;

c) course scheduling rules for said training programs, wherein said scheduling rules comprise a sequence of tiers of constraint relaxed course rules, said tiers disposed in said sequence according to one or more constraints relaxed in a succeeding tier in comparison with each preceding tier; and d) an available resources list, specifying available time slots and classrooms;

ii. compute a locally optimized plan schedule comprising schedules of said training programs in said plan request; said schedule of said training programs computed in order of said training programs in said plan vector; said plan schedule comprising course starting dates and activity time slots of each of said training programs in said plan request; computing of said starting dates and said activity time slots in conformity with said available resources and said scheduling rules for said training programs; computing a of each training program schedule further employs a look ahead-to-save algorithm, configured to find one or more of a least expensive date and time slot in a day to schedule an activity, resources having a minimum hourly rate, a late-in-the-day said time slot to schedule a start of said training program, and an early-in-the-day said time slot to schedule an end of said training program;

iii. when scheduling each training program, if failing to schedule a said course starting date and/or activity time of the training program in conformity with said scheduling rules in a said course rules tier, replacing said scheduling rules of said course rules tier with scheduling rules in said next tier in said sequence and repeating said step of scheduling the training program;

b. an evaluator configured to receive said locally optimized plan schedule and calculate a plan cost of said plan schedule; and c. a solver, for determining a globally optimized plan schedule of said training programs based on said locally optimized plan schedules, said solver configured to i. receive said plan cost, compare the plan cost with one or more plan costs from earlier optimization iterations, and determine if an exit criterion is met;

ii. if the exit criterion is not met, rearrange said order of said training programs in said plan vector, by using a simulated annealing algorithm at a temperature computed as a function of said plan cost in one or more of said iterations, and then sending said rearranged plan vector to the scheduler for another iteration;

iii. if the exit criterion is met, reporting the plan schedule with the minimum plan cost as a globally optimized plan schedule.

2. The system of claim 1, wherein said scheduling rules in at least one of said course rules tiers further comprise one or more mandatory constraints, optionally comprising regulatory requirements, contractual requirements, or any combination thereof.

3. The system of claim 1, wherein one or more pluralities of said activities in one or more said training courses are grouped in one or more clusters; said course scheduling rules further comprising cluster rules of said clusters, said cluster rules optionally comprise a maximum duration from a first activity to a last activity in a said cluster, exceeding a maximum time gap between activities in said cluster, limitations of switching locations during a said cluster, whether said cluster must be a first event of a day, a number of days of rest after said cluster, or any combination thereof.

4. The system of claim 1, wherein for one or more of said time slots in a day, said course scheduling rules further comprise excluding travel to an activity on a same day as said activity if said activity is scheduled during said at least one time slot.

5. The system of claim 1, wherein said instructions further comprise ordering said training courses in a plan vector of an initial optimization iteration according to an order selected from the group consisting of earlier-to-later earliest course starting date, later-to-earlier earliest course starting date, longest-to-shortest course duration, shortest-to-longest course duration, long-slack to short-slack, short-slack to long-slack, according to input of a user, at random, and any combination thereof.

6. The system of claim 1, wherein said computing a plan schedule further employs a look-ahead-to-share algorithm in order to find one or more activities in said training program that can share a same resource.

7. The system of claim 1, wherein said instructions further comprise steps, upon failing to find said course starting date of a said training program or said activity time slots for a said activity, of resetting said one or more training programs and activities and searching for a rescheduling date to reschedule said training program and managing at least one black and white calendar, each said black and white calendar comprising a. black dates, defined as dates on which said training programs or activities failed to be scheduled; and b. white dates, defined as dates on which said training programs or activities succeeded to be scheduled; wherein said step of computing a plan schedule is configured to search said white dates and skip said black dates when searching for said rescheduling date.

8. The system of claim 1, further comprising one or more steps of: finding one or more least expensive locations to conduct a said training program, minimizing the number of changes of locations during said training program, minimizing a number of trips by one or more instructors of said training program, or any combination thereof.

9. The system of claim 1, wherein said instructions further comprise steps of defining one or more instructor buffers; said buffers being a schedule of numbers of instructors to be kept on reserve for contingency absences of allocated instructors; and attempting to balance said buffer according to known training volume and availability of resources.

10. The system of claim 1, wherein said instructions further comprise a step of scheduling travel between training centers in light of an airline flight schedule.

11. The system claim 1, wherein said exit criterion is selected from a group consisting of a maximum number of optimization iterations, a maximum amount of elapsed processing time, said plan cost reaching a predefined cost target, said plan cost reaching a predefined improvement in reduced cost or increased profit, reaching an optimization iteration when an improvement in reduced cost or increased profit does not exceed a threshold fraction of a previous plan cost, and any combination thereof.

12. The system of claim 1, wherein for an initial said iteration of computing a plan schedule an initial said plan vector is provided by a user.

13. The system of claim 1, wherein said scheduling rules further comprise a restriction selected from the group consisting of: an earliest activity starting time slot, a latest activity ending time slot, hours of duty, a rest time between duties, a maximum time between two activities in a training program, equipment availability hours, restriction of instructors for said activities, a maximum duration of a training program, or any combination thereof.

14. A computer-implemented method of producing globally optimized training program schedules, performed iteratively to determine a globally optimized schedule plan of a plurality of training programs, said method comprising steps of
   a. obtaining:
      i. a plan request specifying a plurality of training programs to be scheduled and resources required for said training programs, said required resources comprising time durations of activities in said training programs and classrooms for activities in said training programs;
      ii. a plan vector specifying an order of said training programs in which to process said training programs for scheduling;
      iii. course scheduling rules for said training programs, wherein said scheduling rules comprise a sequence of tiers of constraint-relaxed course rules, said tiers disposed in said sequence according to one or more constraints relaxed in a succeeding tier in comparison with each preceding tier; and
      iv. available resources, comprising available time slots and classrooms;
   b. computing a locally optimized plan schedule comprising schedules of said training programs in said plan request; said schedules computed in order of said training programs in said plan vector; said plan schedule comprising course starting dates and activity time slots of each of said training programs in said plan request; computing of said starting dates and said activity time slots is made in conformity with said available resources and said course scheduling rules for said training programs; said computing a locally optimized plan schedule further employs a look-ahead-to-save algorithm configured to find one or more of a least expensive date and time slot in a day to schedule an activity, resources having a minimum hourly rate, a late-in-the-day said time slot to schedule a start of said training program, and an early-in-the-day said time slot to schedule an end of said training program;
   c. when scheduling each training program, if failing to schedule a said course starting date and/or activity time of the training program in conformity with said scheduling rules in said course rules tier, replacing said scheduling rules of said course rules tier with scheduling rules in said next tier in said sequence and repeating scheduling of the training program;
   d. evaluating a plan cost of said plan schedule;
   e. comparing said plan cost with one or more plan costs from earlier optimization iterations of said method;
   f. if an exit criterion is met, then reporting the plan schedule with the minimum plan cost as a globally optimized plan schedule;
   g. determining a globally optimized plan schedule based on said locally optimized plan schedules, whereby if said plan schedule does not meet said exit criterion, then:
      i. computing a new plan vector; said computing a new plan vector employing a simulated annealing algorithm at a temperature computed as a function of said plan costs of one or more optimization cycle iterations; and
      ii. replacing said plan vector with said new plan vector and proceeding from step (b).

15. The method of claim 14, wherein scheduling rules in at least one of said course rules tiers comprises one or more mandatory constraints, optionally comprising regulatory requirements, contractual requirements, or any combination thereof.

16. The method of claim 14, wherein said step of computing a schedule of a training program comprises steps of
   a. searching for a next available course starting date that meets said course scheduling rules for said training program;
   b. if a said available course starting date is not found, then replacing said scheduling rules with a said next tier in said sequence of course scheduling tiers;
   c. scheduling the course starting date of said training program to said found next available course starting date;
   d. selecting an activity in said training program for scheduling;
   e. searching for a number next available activity time slots required for scheduling said activity; said activity time slots no earlier than said course starting date; said activity time slots meeting said course scheduling rules;
   f. if said next available activity time slots are found, then scheduling said activity foresaid found activity time slots;
   g. if a next available activity time is not found, then cancelling said course starting date and said scheduled activity time slots of said training program and returning to step (a);
   h. repeating step (c)-(f) for each activity in said training program; and
   i. repeating steps (a)-(h) for each training program in said plan.

17. The method of claim 16, wherein at least some of said activities in said training program are arranged into one or more clusters; said scheduling object data further comprises one or more cluster scheduling rules for a said cluster; the method further comprising steps of:
   a. selecting a cluster in said training program;
   b. selecting an activity in said cluster of said training program;
   c. said step of searching for a number of time slots required for scheduling the activity that meet course scheduling rules further comprises the requirement that said timeslots meet said cluster scheduling rules; and
   d. if said activity time slots were not found, then cancelling the scheduled course starting date and activity times of the training program and proceeding with step 17(a).

18. The method of claim 17, wherein said cluster scheduling rules are in one of a sequence of constraint-relaxed cluster rules tiers; wherein said one or more cluster scheduling rules in a cluster rules tier are removed or relaxed in a next cluster rules tier in said sequence; the method further comprising steps of:
   a. if said activity time slots are found, checking if there is a next cluster rules tier in said sequence; and
   b. if there is a said next cluster rules tier, then:
      i. cancelling said scheduled activity times for activities in the cluster;
      ii. shifting to said relaxed cluster rules tier; and
      iii. proceeding with step 18(b).

19. The method of claim 16, wherein said step of searching for a next available course starting date is selectable from a group consisting of: searching for an earliest next available course starting date, searching for a fixed-balancing starting date, and searching for a dynamic balancing starting date; further wherein a latest course starting date is calculated as:

Latest course starting date=Late boundary date of the training program−said Minimum course duration of the training program.

20. The method of claim 16, wherein said searching for an earliest next available course starting date comprises steps of
a. selecting said early boundary date for said training program;
b. if said selected date is blacked out, then selecting a date on the morrow of said blacked out date and repeating step (b);
c. if said selected date does not meet said scheduling rules, then blacking out said selected date and proceeding from step (b);
d. if said selected date is later than a late boundary date of said training program, then proceeding to step 17(b);
e. reporting said selected date as the next available starting date and proceeding to step 17(c).

21. The method of claim 14, wherein said scheduling rules further comprise a restriction selected from the group consisting of: an earliest activity starting time slot, a latest activity ending time slot, hours of duty, a rest time between duties, a maximum time between two activities in a training program, equipment availability hours, restriction of instructors for said activities, a maximum duration of a training program, ofany combination thereof.

* * * * *